F. Russell.
Harvester Cutter.
No. 27,159.
Patented Feb. 14, 1860.
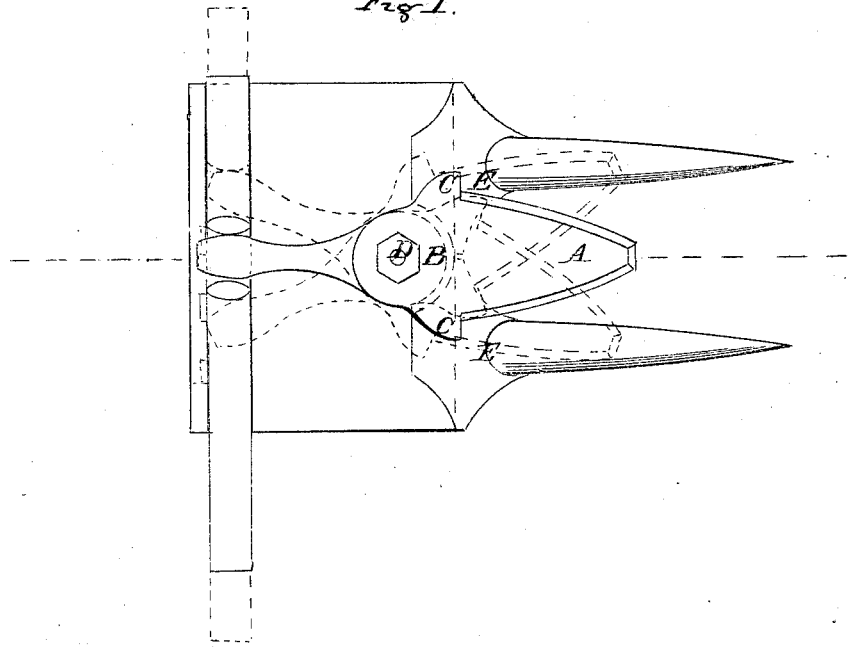
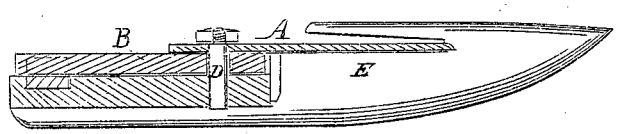
Witnesses:
Fish Russell Inventor:
By Munn & Co.
Attorneys
and
Solicitors of Patents
New York

UNITED STATES PATENT OFFICE.

FISK RUSSELL, OF MANCHESTER, NEW HAMPSHIRE.

IMPROVEMENT IN MOWING-MACHINE CUTTERS.

Specification forming part of Letters Patent No. 27,159, dated February 14, 1860.

*To all whom it may concern:*

Be it known that I, FISK RUSSELL, of Manchester, in the county of Hillsborough, and in the State of New Hampshire, have invented a new Improvement in Mowing-Machine Cutters; and I do hereby declare that the following is a full, clear, and exact description thereof, reference being had to the accompanying drawings, making a part of this specification, and to the letters of reference marked thereon, in which—

Figure 1 is a top view. Fig. 2 is a longitudinal section.

Similar letters of reference indicate corresponding parts in the figures.

This invention relates to an improvement in that class of mowing-machines in which detached pivoted vibrating or oscillating cutters are used.

The object of the invention is to so form the cutters that there cannot be any loose grass drawn under the cutters between them and the guard-fingers to clog them or in any way retard their motion.

To enable those skilled in the art to fully understand and construct my invention, I will proceed to describe it.

A represents the blade of the cutters, which are made of plate-steel, with wings or projections—one on each side of the cutter-blade. The said cutter-blades A are permanently attached to hubs or bosses B—one to each—said hubs or bosses being fitted onto vertical studs D, made fast to the cutter-bar.

B represents the hub or boss to which the cutter-blade A is made fast.

C C represent the wings or projections on each side of the cutter A, made of sufficient length as not to allow the ends of them when they vibrate to pass off of the guard-fingers E and allow the grass to pass around the ends of them, and thereby get drawn under the cutters.

I do not claim making the cutter A fast to the hubs or bosses; neither do I claim putting the cutters onto the finger-bar by means of a stud made fast in the bar, for those I have used before; but,

Having thus described my invention, what I claim as new, and desire to secure by Letters Patent, is—

The combination of the wings or projections C with the blades A, when the latter are pivoted and when the said projections are arranged to operate in connection with the guards as and for the purpose set forth.

FISK RUSSELL.

Witnesses:
GEORGE HOLMES,
SAMUEL NEWMARCH.